United States Patent
Buschmann

(10) Patent No.: US 10,435,066 B2
(45) Date of Patent: Oct. 8, 2019

(54) ROAD PAVER WITH STEERING COMPENSATION AND CONTROL METHOD

(71) Applicant: JOSEPH VOEGELE AG, Ludwigshafen/Rhein (DE)

(72) Inventor: Martin Buschmann, Neustadt (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 0 days.

(21) Appl. No.: 15/976,935

(22) Filed: May 11, 2018

(65) Prior Publication Data
US 2018/0327023 A1    Nov. 15, 2018

(30) Foreign Application Priority Data
May 11, 2017    (EP) .................................... 17170604

(51) Int. Cl.
| | |
|---|---|
| *E01C 19/22* | (2006.01) |
| *B62D 6/00* | (2006.01) |
| *E01C 19/00* | (2006.01) |
| *E01C 19/48* | (2006.01) |

(52) U.S. Cl.
CPC ............ *B62D 6/002* (2013.01); *E01C 19/004* (2013.01); *E01C 19/22* (2013.01); *E01C 19/48* (2013.01); *E01C 2301/14* (2013.01)

(58) Field of Classification Search
CPC ..... E01C 19/004; E01C 19/22; E01C 2301/14
USPC ................................................. 404/84.5, 84.8
See application file for complete search history.

(56) References Cited

U.S. PATENT DOCUMENTS

| | | | | |
|---|---|---|---|---|
| 6,109,825 | A | * | 8/2000 | Yon ..................... E01C 19/4893 404/84.05 |
| 8,294,884 | B2 | | 10/2012 | Buehlmann |
| 9,181,660 | B2 | * | 11/2015 | Fritz ....................... E01C 19/00 |
| 9,260,827 | B2 | | 2/2016 | Bertz et al. |
| 9,598,080 | B2 | * | 3/2017 | Fritz ....................... E01C 19/00 |
| 9,670,629 | B2 | | 6/2017 | Buschmann et al. |

(Continued)

FOREIGN PATENT DOCUMENTS

| | | |
|---|---|---|
| EP | 0 620 319 A1 | 10/1994 |
| EP | 1 990 472 A1 | 11/2008 |

(Continued)

OTHER PUBLICATIONS

European Search Report dated Nov. 3, 2017, Application No. 17170604.7-1614, Applicant Joseph Voegele AG, 7 Pages.

(Continued)

*Primary Examiner* — Gary S Hartmann
(74) *Attorney, Agent, or Firm* — Brooks Kushman P.C.

(57) ABSTRACT

A method for operating a road paver comprises paving a road surface with the road paver along a road bed, wherein a paving screed of the road paver is drawn over the road bed along a paving direction of travel. The following steps are performed using a curve correction unit: determining a value defining a steering angle of the road paver; calculating based on the determined value an expected offset of the paving screed, which results from a yawing movement of the road paver during steering with the steering angle defined by the determined value; and automatically correcting a lateral extension position of at least one lateral extension part of the paving screed based on the expected offset, so that the offset is compensated.

20 Claims, 2 Drawing Sheets

(56) References Cited

U.S. PATENT DOCUMENTS

| | | |
|---|---|---|
| 2011/0150572 A1 | 6/2011 | Fritz et al. |
| 2017/0044726 A1 | 2/2017 | Buschmann et al. |
| 2018/0030672 A1* | 2/2018 | Marsolek .............. E01C 19/008 |

FOREIGN PATENT DOCUMENTS

| | | |
|---|---|---|
| EP | 2 620 549 A1 | 7/2013 |
| EP | 3 106 562 A1 | 12/2016 |
| JP | S61-146501 U | 9/1986 |
| JP | 6-294106 A | 10/1994 |
| JP | H10-037124 A | 2/1998 |
| JP | 2009-029271 A | 2/2009 |
| JP | 2009-121192 A | 6/2009 |
| JP | 2014-240594 A | 12/2014 |
| JP | 2016-079570 A | 5/2016 |
| JP | 2017-036660 A | 2/2017 |

OTHER PUBLICATIONS

European Office Action dated Jul. 27, 2018, Application No. 17 170 604.7-1002, Applicant Joseph Voegele AG, 4 Pages.

Japanese Office Action dated Apr. 16, 2019, Application No. 2018-092070, 4 Pages.

\* cited by examiner

ROAD PAVER WITH STEERING COMPENSATION AND CONTROL METHOD

CROSS-REFERENCE TO RELATED APPLICATIONS

This application claims foreign priority benefits under 35 U.S.C. § 119(a)-(d) to European patent application number EP 17 170 604.7, filed May 11, 2017, which is incorporated by reference in its entirety.

TECHNICAL FIELD

The present disclosure relates to road pavers with a paving screed for compacting paving material, as well as to methods for controlling such road pavers.

BACKGROUND

Known road pavers include a material bunker for receiving paving material at the front of the road paver with respect to the paving direction of travel. During paving, the paving material is fed via suitable conveying equipment of the road paver from the material bunker to a paving screed pulled behind the paver for compacting the paving material. Paving screeds are known to be provided with lateral extension parts on both sides. The paving width covered by the paving screed can be adjusted to the geometry of the road to be paved by laterally extending or retracting the extension parts perpendicular to the direction of travel of the road paver. The paving working width of the screed is usually controlled manually by a paving screed operator on the left or right-hand side of the paving screed by extending or retracting the extension part for each side.

The paver rotates around a vertical yaw axis (yaw motion) when paving a curve with the paver during a paving run. In road pavers with a crawler track, the yaw axis is located approximately in the centre of gravity of the road paver. In road pavers with a wheeled track, the yaw axis is located in between the unsteered wheels of the rear axle. That means the yaw axis is located in front of the paving screed with respect to the paving direction of travel in both cases. Since the paving screed and its extension parts are located behind the paving screed's yaw axis with respect to the paving direction of travel, they both pivot together when driving on a curve. In particular, a lateral outermost rear point of an extension part of the paving screed on an inner side of the curve swivels from an edge of the target road way on an inner side of the curve towards the road edge on the outer side of the curve. This leads to a step in the road edge on the inside of the curve. In practice, this step is manually controlled by the paver operator by adjusting (extending) a lateral extension position of the paving screed's extension part on the inside of the curve to compensate for any offset of the paving screed. This requires the attention of the operator, who must also perform other tasks, such as instructing the driver, especially when the road paver is driving around a curve. Since the operator can only control the step in the road edge manually when the offset of the paving screen has already occurred, even an experienced paver operator will always have an offset and thus a defect in the road. On the outside of the curve, too, there is an offset of the paving screed, here particularly in an outward direction with respect to the road to be paved. As a rule, it is not possible for the operator to quickly and accurately adjust the extension positions of the extension parts of the paving screed on both sides.

A road paver is known from the EP 3 106 562 A1, which is equipped with a sensor that detects a line on the ground along which the road surface is to be paved. Based on a sensor signal, a distance between the line and a side plate of the paving screed is determined. This distance is used to adjust an extension position of the side plate relative to the line. The detected line may be an edge of a section of a road to be widened or a tensioned guide wire, for example. The disadvantage of this system is that it must be ensured before paving begins that the reference line followed by the side plate of the paving screed corresponds to the desired course of paving or that a guide wire has to be mounted with great effort.

EP 0 620 319 B1 also discloses the adjustment of an extension position of a lateral extension part of a paving screed based on a measured distance to a reference line at ground level. In this system, two sensors spaced apart along the paver's direction of travel are provided on the paving screed's extension part, each of which detects the distance to the reference line. Depending on whether a narrowing, a widening area or an area of constant width of the road is being paved, either the distance to the reference line measured by the rear sensor or the front sensor is used to set the extension position of the extension part of the paving screed. This is done to better adapt the extension unit's extension position to the course of the road. This system also requires the presence of a clearly detectable reference line following the desired course of paving.

SUMMARY

It is an object of the disclosure to provide a method for operating a road paver and a road paver with which negative effects of a yaw movement of the paving screed on the road quality or paving sequence can be largely avoided when the paver drives around bends without great operating effort, in particular without the need for an external reference line along the planned course of the road.

A method according to the disclosure of operating a road paver involves paving a road surface with the road paver along a road bed. In this process, a paving screed of the road paver is drawn over the road bed along the paving travel direction of travel to compact the road surface. In particular, the paving screed can be articulated to the road paver on both sides by means of drawbars and be supported floating by the paving material to be compacted during paving.

A curve correction unit of the road paver determines a value defining a steering angle of the road paver. This value allows determining, particularly definitely determining, the steering angle of the road paver, taking into account known parameters of the road paver. Based on the detected value defining the steering angle of the road payer, the road paver's curve correction unit calculates an expected offset of the paving screed existing due to a yawing movement of the road paver when steering at the steering angle defined by the determined value. Based on the calculated, expected offset of the paving screed, the road paver's curve correction unit automatically corrects a lateral extension position of at least one lateral extension part of the paving screed so as to compensate for the offset of the paving screed.

According to the disclosure, the paving screed's offset is automatically corrected based on the value defining the road paver's steering angle. For the required calculations, the known machine geometry of the road paver can be used. An operator on the paving screed is no longer required to manually correct the lateral extension position of the extension part of the paving screed when the paver is in a curve, but is free to perform other tasks, e.g., instructing the driver. The paving screed's offset is particularly precisely compensated by the method according to the disclosure, as an appropriate adjustment of the extension position can be optimally calculated for the steering angle and does not have to be adjusted "by feel" by the operator. The method according to the disclosure does not depend on the existence of an external reference, such as an existing road edge or a guide wire, and can therefore be used universally.

In the case of a road paver with a wheeled track, the value defining the steering angle of the road paver may, for example, be a steering angle of one or more steered wheels, in particular steered front wheels, of the road paver. In particular, the steering angle of a selected steered wheel of the road paver or an average of the steering angles of all steered wheels of the road paver can be used.

Alternatively, for a road paver with a wheeled track, a difference between the speed of a left-hand wheel of the road paver with respect to the paving direction and the speed of a right-hand wheel of the road paver with respect to the paving direction could be used as the value defining the steering angle of the paver.

However, it is also conceivable to instead use a difference between a distance travelled in a period of time by a left-hand wheel of the road paver with respect to the paving direction and a distance travelled in the period of time by a right-hand wheel of the road paver with respect to the paving direction as the value defining the steering angle of the road paver.

If the road paver is a road paver with a crawler track, for instance a difference between the speed of the road paver's left-hand track with respect to the paving direction and the speed of the road paver's right-hand track with respect to the direction of paving can be used as the value defining the steering angle of the road paver.

However, it is also conceivable to use instead a difference between a distance travelled in a period of time by a left-hand track of the road paver with respect to the paving direction and a distance travelled in the period of time by a right-hand track of the road paver with respect to the paving direction as the value defining the steering angle of the road paver.

The steering angle of one or more of the road paver's steered wheels, the difference in speed between a right-hand and left-hand drive means of the road paver and the difference between the distances covered by a right-hand and left-hand drive means in a period of time are extremely reliable indicators of the actual steering angle of the road paver and are therefore a reliable starting points for calculating an appropriate correction of the extension position of the at least one lateral extension part of the paving screed. In addition, these values can be easily determined and are ideally already available for other purposes anyway.

However, it would also be conceivable to use a value other than the value defining the steering angle of the road paver, for example a set position of a steering wheel of the road paver.

The value defining the steering angle of the road paver can be measured with a sensor unit of the road paver or be calculated from a measured value measured with a sensor unit of the road paver. This ensures that the value defining the steering angle of the road paver also indicates the actual situation on the road paver.

For example, the sensor unit can have a steering angle sensor for determining the steering angle of a steered wheel of the road paver. The sensor unit could also include rotation sensors to determine the speed of a left-hand wheel of the paver with respect to the paving direction of travel and a right-hand wheel of the paver with respect to the paving direction of travel. The difference between the measured speeds of the two wheels can be used as the value defining the steering angle of the road paver. It is also conceivable that the sensor unit comprises a distance measuring system for determining a distance travelled in a period of time by a left-hand wheel of the road paver with respect to the paving direction of travel and a distance travelled in the period of time by a right-hand wheel of the road paver with respect to the paving direction of travel. The difference between the measured distances can be used as the value defining the steering angle of the road paver.

Alternatively, the sensor unit can have rotation sensors to determine the speed of a road paver's left-hand track with respect to the paving direction of travel of the road paver and the speed of a right-hand track with respect to the paving direction of travel of the road paver. The difference between the measured speeds of the two tracks can be used as the value defining the steering angle of the road paver. It is also conceivable that the sensor unit comprises a distance measuring system for determining a distance travelled in a period of time by a road paver's left-hand track in the paving direction of travel and a distance travelled in the period of time by a road paver's right-hand track in the paving direction of travel. The difference between the measured paths can be used as the value defining the steering angle of the road paver.

The value defining the steering angle of the road paver can also be obtained from a user input for controlling the road paver or from a control signal for controlling a road paver's drive.

For example, a steering wheel position to be set by the road paver operator anyway can be used as the value defining the steering angle of the road paver. To steer the road paver, the position of the steering wheel position must be processed by the road paver anyway, so that no additional measures need to be taken to determine the position of the steering wheel.

For example, a control signal for adjusting the steering angle of a steered wheel of the road paver could be fed not only to the corresponding steering actuator but also to the curve correction unit of the road paver, which corrects the extension position of the lateral extension part when driving on a curve. According to such an embodiment, it is not necessary to provide an additional sensor unit on the road paver to determine the value defining the steering angle of the road paver.

It is also conceivable that the value defining the steering angle of the road paver could be entered directly by user input. In particular, the steering angle of the road paver itself can be entered by a user.

When driving on a curve, it is preferable to correct at least the lateral extension position of a lateral extension part of the paving screed on the inside or outside of the curve, based on the expected offset of the paving screed.

The correction of the extension position of the extension part on the inside of the curve is particularly important, since a rearmost, lateral outer point of the extension part on the inside of the curve due to the yawing movement of the road paver is subjected to an offset in the direction towards the road edge on the outer side of the curve and thus the road surface to be paved would, without a correction, not be paved up to a curve inner target edge and/or would not be compacted by the paving screed. Alternatively or additionally, the extension position of an extension part of the paving screed on the outside of the curve can also be corrected on the basis of the calculated expected offset of the paving screed. Based on the expected offset, both a lateral extension position of an extension part of the paving screed on the right-hand side with respect to the direction of travel of the road paver and a lateral extension position of an extension part on the left-hand side with respect to the direction of travel of the road paver on the paving screed are preferably corrected in order to achieve optimum adaptation to the curve on both sides.

The correction of the lateral extension position of the right extension part and the correction of the lateral extension position of the left extension part are preferably compensated for to zero in such a way that an overall width of the paving screed remains constant. In this way, a uniform road width can be achieved. In this case, it is only necessary to calculate the correction of the extension position for one of the lateral extension parts of the paving screed which can also be used to correct the other extension part complementarily.

Determining the value defining the steering angle of the road paver, calculating the expected offset and correcting the lateral extension position of the paving screed's at least one lateral extension part can be carried out at regular intervals so that it is possible to react to a change of the steering angle of the road paver at any time. The time interval between two consecutive interval runs can be less than 1 s, less than 10 s, less than 20 s or less than 30 s, for example. In view of the slow paving speed of road pavers of just a few meters per minute, an almost instantaneous reaction to a changed steering angle can be achieved.

According to the disclosure, a road paver is also provided. The road paver is configured, designed and suitable for carrying out the inventive method. Features described with regard to the method can be transferred to the road paver and vice versa.

A road paver according to the disclosure comprises a material bunker for receiving paving material located at the front of the road paver with respect to the paving direction of travel. In addition, the road paver is equipped with a paving screed for compacting the paving material provided at the rear of the road paver with respect to the paving direction of travel. The paving screed comprises at least one lateral extension part. The paving screed preferably comprises an extension part to the right-hand side of the paving direction of travel and an extension part to the left-hand side of the paving direction of travel.

The road paver according to the disclosure also includes a curve correction unit. The curve correction unit is configured to determine a value defining a steering angle of the road paver. In addition, the curve correction unit is configured to calculate based on the determined value an expected offset of the paving screed resulting from a yawing movement of the road paver when steering at the steering angle defined by the determined value. The curve correction unit is also configured to automatically correct a lateral extension position of the at least one lateral extension part of the paving screed based on the calculated expected offset to compensate for the offset.

Advantageous embodiments of the road paver according to the disclosure result from the features discussed above in relation to the method.

In the following, the disclosure is explained with reference to the attached drawings using embodiments.

DETAILED DESCRIPTION

Figure 1:
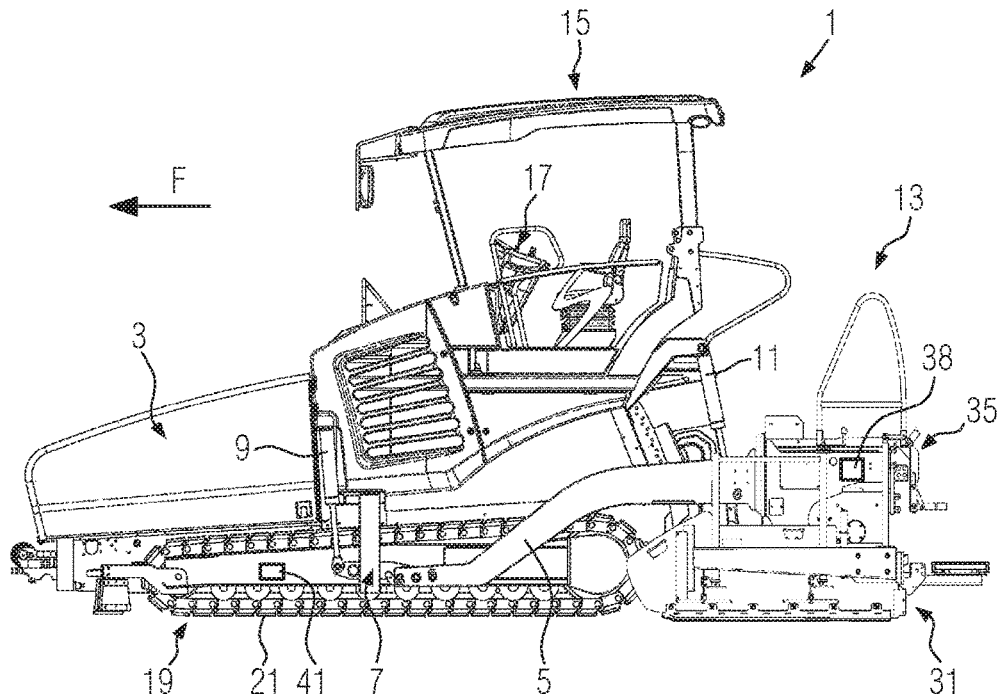
FIG. 1 shows a schematic side view of a road paver according to the disclosure in an embodiment with crawler track.
Figure 2:
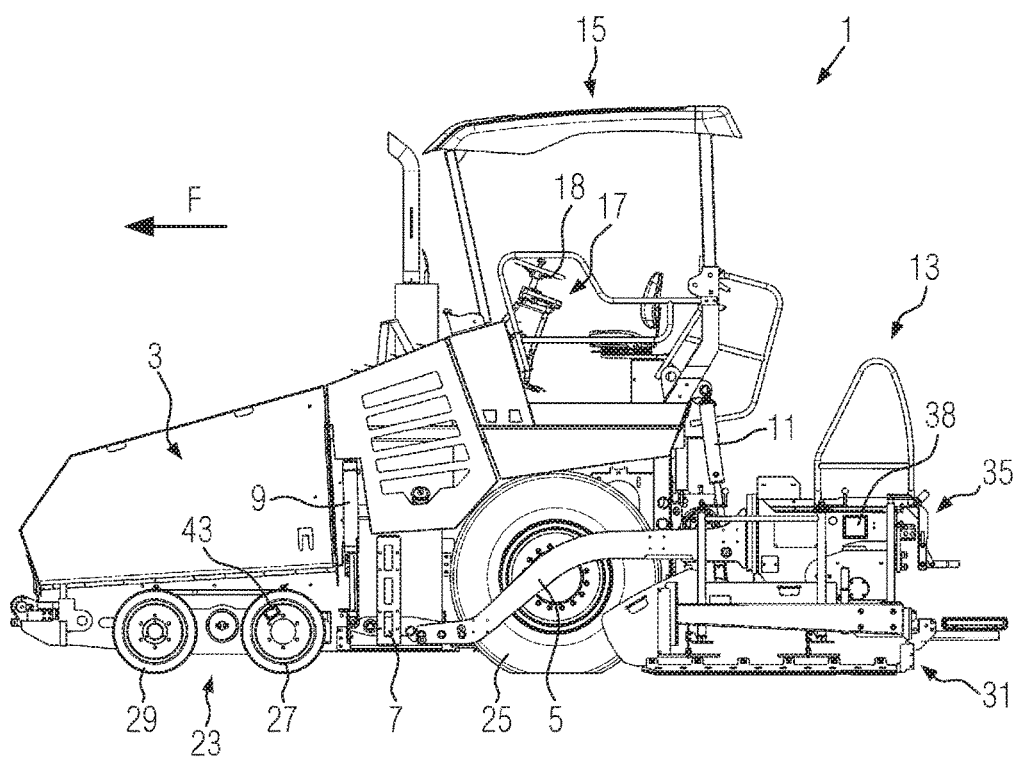
FIG. 2 shows a schematic side view of a road paver according to the disclosure in an embodiment with wheel drive.

FIGS. 1 and 2 each show a road paver 1 according to the disclosure in schematic side view according to an embodiment. In paving direction F at the front of the road paver 1, there is a material bunker 3 for receiving the paving material. On both lateral sides of the road paver 1 with respect to the paving direction of travel F, a drawbar 5 is held via a height-adjustable pivot point 7, respectively. The height of the pivot point 7 can be adjusted with a pivot hydraulic cylinder 9 on the road paver 1. On a rear side of the road paver 1, the drawbars 5 are mounted again on both sides of the road paver 1 via height-adjustable rear hydraulic cylinders 11. A paving screed 13 for compacting the paving material is suspended from the rear ends of the drawbars 5. During paving, the paving screed 13 is drawn behind the road paver 1 by the drawbars 5 on the paving material in a floating position. An operator's platform 15 of the road paver 1 provides space for one operator and comprises operating units 17, with which inputs can be made to control road paver 1.

The road paver 1, as shown in FIG. 1, comprises a crawler track 19 with one track 21 each on the left-hand and right-hand sides of the road paver 1 with respect to the paving direction of travel F. Only the left track 21 is visible in FIG. 1.

In the alternative embodiment as shown in FIG. 2, the road paver 1 comprises a wheeled track 19 instead of a crawler track 23, comprising a pair of non-steered rear wheels 25 and a pair of steered front wheels 27, and a second pair of front wheels 29, which may or may not be steered, in the embodiment shown.

The paving screed 13 of the road pavers 1 of both embodiments comprises one lateral extension part 31, 33 each at both sides with respect to the paving direction of travel F. The extension parts 31, 33 preferably have a side plate 32, 34 at each of their laterally outer ends to laterally limit the paving width. In FIGS. 1 and 2, only the left extension part 31 is visible with respect to the paving direction of travel F. The road pavers 1 according to the illustrated embodiments comprise on the right-hand side with respect to the paving travel direction F also a particularly analogously formed extension part 33 (see FIG. 3). The lateral extending parts 31, 33 can be extended and retracted to the left or right via actuators provided on paving screed 13 in order to vary the paving width of the road paver 1. The extension positions of the extension parts 31, 33 can be set by an operator on the paving screed 13 via input elements on a paving screed operator's platform 35, in order to achieve a transition between road sections of different widths during paving, for example. The extension parts 31, 33 and the non-extendable unit of the paving screed 13 preferably comprise compaction elements for compacting the paving material, e.g., a pressure bar and/or vibratory equipment.

Figure 3:
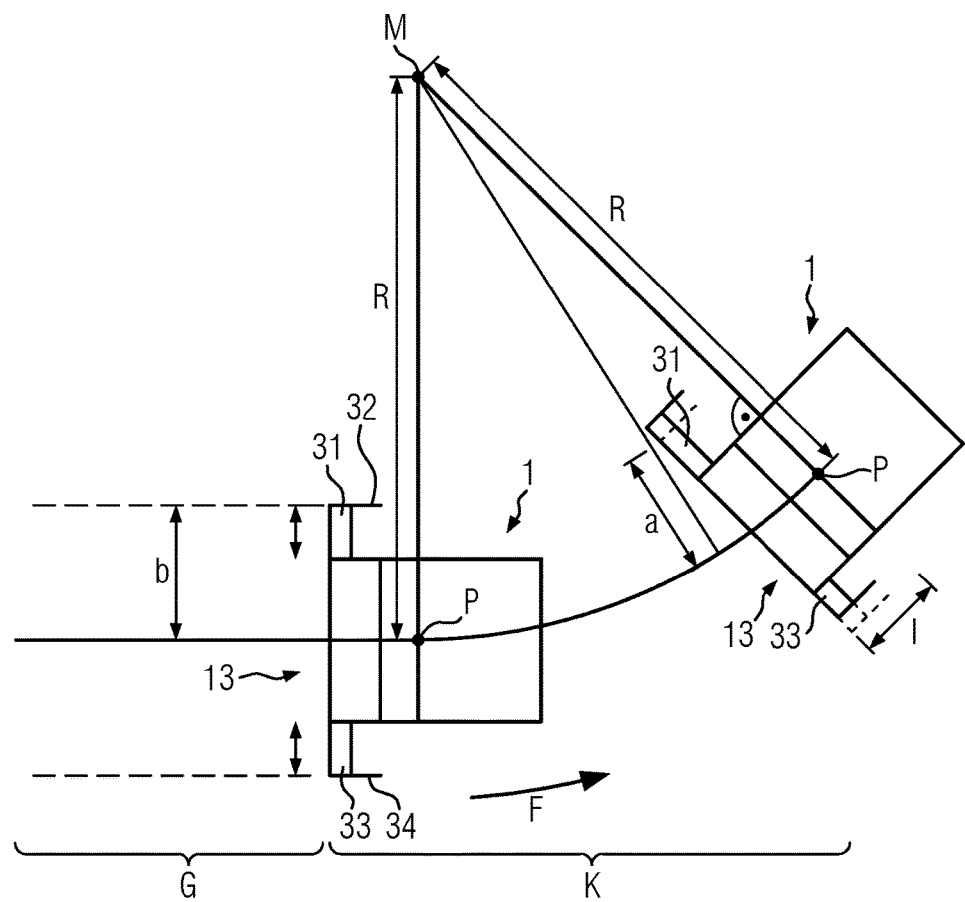
FIG. 3 shows a schematic plan view of a road paver in two consecutive positions when paving a road curve to illustrate the correction of the lateral offset of the paving screed.

FIG. 3 shows a road paver 1 paving a road surface along a road bed in two consecutive positions in schematic plan view. The road paver 1 can be a road paver 1 of the type shown in FIG. 1 or 2. The left illustration of the road paver 1 in FIG. 3 shows the road paver 1 in a paving situation where it has just paved a straight section G of the road surface and is about to make a curve for paving a curve section K adjoining the straight section G. In the example shown the road paver 1 after paving the straight section G, moves through a curve with the constant curve radius R and the curve centre M. The illustration of the road paver 1 shown on the right-hand side in FIG. 3 shows the road paver while on the curve at a time later compared to the left-hand illustration. For driving around the curve, the road paver 1 can be steered by a paver operator in the operator's stand 15 by means of appropriate operating units 17, such as a steering wheel 18. In the case of the road paver 1 with crawler track 19, a certain steering angle of the road paver 1 and thus a curve radius R can be set, in particular by setting a differential speed of tracks 21 (left and right track 21) of the road paver 1. On a wheeled road paver 1, a steering angle of the road paver 1 and thus a curve radius R can be set, in particular by adjusting a steering angle of the steered wheels 27 of the road paver 1.

When the road paver 1 is steered to drive a curve, the road paver 1 performs a yaw movement around a vertical axis passing through a fixed yaw point P of the road paver 1. The yaw point P of a road paver 1 with crawler track 19 is approximately in the centre of gravity of the road paver 1, and of a road paver 1 with a wheeled track 23 between the unsteered wheels 25 of the rear axle. Since the paving screed 13 is located behind the yaw point P in both cases, it swings out when cornering. A curve outer-side outermost and with respect to the paving travel direction F of the road paver 1 rearmost point of the paving screed 13 is subjected to an offset away from the curve inner-side due to the yaw movement of the road paver 1, i.e., with respect to the curve outer-side road edge towards the outside. In the case of a left-hand curve as shown in FIG. 3, the rearmost point of the left extension part 31 of the paving screed 13 is offset towards the centre of the road. The lateral outermost rear point of the right-hand extension part 33 of the paving screed 13 is subjected to an offset from the centre away from the road towards the outside.

Previously, an offset of the paving screed 13 caused by the yaw movement of the road paver 1 when cornering had to be adjusted by an operator at the paving screed stand 35 by manual adjustment. This requires the attention of the operator, who is not available for other tasks at least at the beginning of cornering. The operator cannot normally check the extension positions of both extension parts 31, 33 of the paving screed 13 simultaneously and must neglect one of the two extension parts 31, 33. When adjusting the offset manually, it is also problematic that the offset can only be adjusted once a visible offset has already occurred. Therefore, even when using an experienced operator, there is a defect on the road.

To illustrate the offset of the paving screed 13 during cornering, the situation is shown in FIG. 3 in the right-hand position of the road paver 1 that the extension positions of extension parts 31, 33 of the paving screed 13 have not been corrected (dashed line for side plates 32, 34), i.e., the extension positions are the same as in the left-hand position of the road paver 1. In addition, the situation is shown that the extension positions of both extension units 31, 33 have been corrected accordingly (continuous lines for the side shields). As shown, for curve correction the extension unit 31 on the inside of the curve must be extended further and the extension unit 33 on the outside of the curve must be retracted. Based on FIG. 3, geometrical considerations show that, without correcting the extension position of the extension part 31 on the inside and outside of the curve, the distance a of the rearmost, outermost point of the extension section 31 on the inside of the curve of the paving screed 13 to the curve traversed by the yaw point P can be calculated during cornering with the curve radius R using the following formula:

$$a = R - ((R-b)^2 + l^2)^{(1/2)}$$

b is the distance between the rearmost, outermost point of the extension section 31 on the inside of the curve and the curve traversed by the yaw point P before the start of the curve run, and l is the distance between the yaw point P of the road paver 1 and the rear outer end of the extension section 31 with respect to the paving travel direction F. l and b are known or determinable as machine parameters of the road paver 1 and as characteristic parameters of the road to be paved. The curve radius R can be calculated from the steering angle of the road paver 1. The result is that the extension part 31 of the paving screed 13 on the inside of the curve must be extended by an amount b–a (offset) to correct the curve:

$$b-a = b - R + ((R-b)^2 + l^2)^{(1/2)}.$$

The road paver 1 according to the disclosure comprises a curve correction unit 38 for automatically correcting the offset of the paving screed 13 due to a yawing movement when the road paver 1 is cornering. The curve correction unit 38 can be formed as a control unit with suitable hardware and comprises, for example, a processor and a memory for program instructions. In the embodiment shown, the curve correction unit 38 is fitted to the paving screed 13. However, it is also conceivable that the curve correction unit 38 could be installed elsewhere on the road paver 1 or that individual components of the curve correction unit 38 could be distributed over the road paver 1. The curve correction unit 38 is configured to determine a value defining a steering angle of the road paver 1.

In the case of a paver 1 with a crawler track 19, the difference between the speed of a left track 21 with respect to the paving direction F and a right track 21 with respect to the paving direction F can be used as the value defining the steering angle of the road paver 1. This can be determined, for example, by the curve correction unit 38 via sensors 41 provided on the crawler track 19 for the speeds of the tracks 21. It is also conceivable, however, that the curve correction unit 38 receives the difference between the speeds of the tracks 21 from a user input for controlling the road paver 1 or a control signal for controlling the crawler track 19 of the road paver 1.

It is also conceivable that a distance measuring system with sensors 41 is provided for determining a distance travelled in a period of time by a road paver 1 left-hand track 21 with respect to the paving direction F and a distance travelled in the same period by a road paver 1 right-hand track 21 with respect to the paving direction F. The difference between the measured distances can be used as the value defining the steering angle of the paver 1.

In the case of a road paver 1 with a wheeled track 23, the steering angle of one or more steered wheels 27 can be used as the value defining the steering angle of the road paver 1. This can be determined by the curve correction unit 38 via sensors 43 provided on the wheeled track 23 or transmitted to the curve correction unit 38 based on a user input for controlling the road paver 1, such as a steering wheel angle of the road paver 1, or a control signal for controlling the wheeled track 23 of the road paver 1.

Alternatively, sensors 43 could also be used to determine the speed of a left wheel 25, 27, 29 of the road paver 1 with respect to paving direction of travel F and a right wheel 25, 27, 29 of paver 1 with respect to paving direction of travel F. The difference between the measured speeds of the two wheels 25, 27, 29 can be used as the value defining the steering angle of the road paver 1.

It is also conceivable that a distance measuring system with sensors 43 is provided for determining a distance travelled in a period of time by a left wheel 25, 27, 29 of the road paver 1 with respect to paving direction of travel F and a distance travelled in the period of time by a right wheel 25, 27, 29 with respect to paving direction of travel F of the road paver 1. The difference between the measured distances can be used as the value defining the steering angle of the road paver 1.

Based on the value defining the steering angle of the road paver 1, the curve radius R of a curve driven by the road paver 1 can be determined. This makes it possible, using the above formulae, for example, to calculate an offset of the paving screed 13 which is expected at the steering angle defined by the determined value due to a yawing movement of the road paver 1 during steering. The curve correction unit 38 is configured to automatically correct the lateral extension position of at least one of the lateral extension parts 31, 33 of the paving screed 13 based on the calculated expected offset. For this purpose, the curve correction unit 38 can control a corresponding actuator for moving the extension parts 31, 33 of the paving screed 13. It is conceivable that the curve correction unit 38 will only automatically correct the extension position of one extension part 31, 33 of the paving screed 13, e.g., of the inner extension part 31 with respect to the curve. However, automatically correcting the extension positions of both extension parts 31, 33 is preferred.

According to a preferred embodiment, only the correction of the extension position of one of the two extension parts 31, 33 is calculated. The second extension part 31, 33 can then be corrected in a complementary manner so that an overall width of the paving screed 13 remains constant. If, for example, the extension part 31 on the inside of the curve is extended by a certain amount, the extension part 33 on the outside of the curve can be retracted by an identical amount without any further calculation.

The curve correction unit 38 can be configured to determine the value defining the steering angle of the road paver 1, calculate the expected offset and correct the lateral extension position at regular time intervals, in particular at intervals of less than 1 s, less than 10 s, less than 20 s or less than 30 s.

What is claimed is:

1. A method for operating a road paver comprising:
   paving a road surface with the road paver along a road bed, wherein a paving screed of the road paver is pulled over the road bed along a paving direction of travel to compact the road surface;
   determining, by a curve correction unit, a value defining a steering angle of the road paver;
   based on the determined value, calculating an expected offset of the paving screed which results from a yawing movement of the paver during steering with the steering angle defined by the determined value; and
   automatically correcting a lateral extension position of at least one lateral extension part of the paving screed based on the expected offset so that the offset is compensated.

2. The method according to claim 1 wherein the value defining the steering angle of the road paver is a steering angle of one or more steered wheels of the road paver or a set position of a steering wheel of the road paver.

3. The method according to claim 1 wherein the value defining the steering angle of the road paver is either a difference between a speed of a track of the road paver on a left-hand side with respect to the paving direction of travel and a speed of a track of the road paver on a right-hand side with respect to the paving direction of travel or a difference between a speed of a wheel of the road paver on the left-hand side with respect to the paving direction of travel and a speed of a wheel of the road paver on the right-hand side with respect to the paving direction of travel.

4. The method according to claim 1 wherein the value defining the steering angle of the road paver is either a difference between a distance covered in a period of time by a wheel of the road paver on a left-hand side with respect to the paving direction of travel and a distance covered in the period of time by a wheel of the road paver on a right-hand side with respect to the paving direction of travel, or a difference between a path covered in a period of time by a track of the road paver on the left-hand side with respect to the paving direction of travel and a path covered in the period of time by a track of the road paver on the right-hand side with respect to the paving direction of travel.

5. The method according to claim 1 wherein the value defining the steering angle of the road paver is measured with a sensor unit of the road paver or is calculated from a measured value measured with a sensor unit of the road paver.

6. The method according to claim 1 wherein the value defining the steering angle of the road paver is obtained from a user input for controlling the road paver or from a control signal for controlling a drive of the road paver and/or wherein the value defining the steering angle of the road paver is directly entered as user input.

7. The method according to claim 1 wherein, based on the expected offset, both a lateral extension position of an extension part of the paving screed which is on a right-hand side with respect to the direction of travel of the road paver and a lateral extension position of an extension part of the paving screed which is on a left-hand side with respect to the direction of travel of the road paver are corrected.

8. The method of claim 7 wherein the correction of the lateral extension position of the right extension part and the correction of the lateral extension position of the left extension part are balanced to zero in such a way that an overall width of the paving screed remains constant.

9. The method according to claim 1 wherein determining the value defining the steering angle of the road paver, calculating the expected offset and correcting the lateral extension position are carried out at regular time intervals.

10. The method according to claim 9 wherein the regular time intervals are less than 30 seconds.

11. The method according to claim 9 wherein the regular time intervals are less than 20 seconds.

12. The method according to claim 9 wherein the regular time intervals are less than 10 seconds.

13. The method according to claim 9 wherein the regular time intervals are less than 1 second.

14. A road paver comprising:
   a material bunker for receiving paving material located at a front of the road paver with respect to a paving direction of travel;
   a paving screed for compacting the paving material provided at a rear of the paver with respect to the paving direction of travel, wherein the paving screed comprises at least one lateral extension part; and
   a curve correction unit configured to determine a value defining a steering angle of the road paver;

calculate, based on the determined value, an expected offset of the paving screed, which is due to a yawing movement of the paver during steering with the steering angle defined by the determined value; and automatically correct a lateral extension position of the at least one lateral extension part of the paving screed based on the expected offset so that the offset is compensated.

15. The road paver according to claim 14 wherein the value defining the steering angle of the road paver comprises a steering angle of one or more steered wheels of the road paver, a set position of a steering wheel of the road paver, a difference between a speed of a track of the road paver on a left-hand side with respect to the paving direction of travel and a speed of a track of the road paver on a right-hand side with respect to the paving direction of travel, or a difference between a speed of a wheel of the road paver on the left-hand side with respect to the paving direction of travel and a speed of a wheel of the road paver on the right-hand side with respect to the paving direction of travel.

16. The road paver according to claim 14 wherein the value defining the steering angle of the road paver is either a difference between a distance covered in a period of time by a wheel of the road paver on a left-hand side with respect to the paving direction of travel and a distance covered in the period of time by a wheel of the road paver on a right-hand side with respect to the paving direction of travel, or a difference between a distance covered in a period of time by a track of the road paver on the left-hand side with respect to the paving direction of travel and a distance covered in the period of time by a track of the road paver on the right-hand side with respect to the paving direction of travel.

17. The road paver according to claim 14 wherein the road paver further comprises a sensor unit configured to measure the value defining the steering angle of the road paver or a measured value from which the value defining the steering angle of the road paver can be calculated.

18. The road paver according to claim 14 wherein the curve correction unit is configured to obtain the value defining the steering angle of the road paver from a user input for controlling the road paver, from a direct user input of the value defining the steering angle of the road paver, or from a control signal for controlling a drive of the road paver.

19. The road paver according to claim 14 wherein the curve correction unit is configured to correct, based on the expected offset, both a lateral extension position of an extension part of the paving screed which is on a right-hand side relative to the direction of travel of the road paver and a lateral extension position of an extension part of the paving screed which is on a left-hand side relative to the direction of travel of the road paver, the curve correction unit being configured to correct the lateral extension position of the right extension part and to correct the lateral extension position of the left extension part in such a way that they balance out to zero so that an overall width of the paving screed remains constant.

20. The road paver according to claim 14 wherein the curve correction unit is configured to determine the value defining the steering angle of the road paver, to calculate the expected offset and to correct the lateral extension position at regular time intervals.

* * * * *